(12) United States Patent
Liu

(10) Patent No.: US 9,871,884 B2
(45) Date of Patent: Jan. 16, 2018

(54) METHOD AND DEVICE FOR TRANSFERRING MESSAGES

(71) Applicant: Xiaomi Inc., Beijing (CN)

(72) Inventor: Guoming Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 275 days.

(21) Appl. No.: 14/741,817

(22) Filed: Jun. 17, 2015

(65) Prior Publication Data
US 2016/0094493 A1    Mar. 31, 2016

Related U.S. Application Data

(63) Continuation of application No. PCT/CN2015/071311, filed on Jan. 22, 2015.

(30) Foreign Application Priority Data

Sep. 30, 2014   (CN) .......................... 2014 1 0521744

(51) Int. Cl.
*G06F 15/16*       (2006.01)
*H04L 29/08*       (2006.01)
*H04L 12/58*       (2006.01)

(52) U.S. Cl.
CPC .......... *H04L 67/306* (2013.01); *H04L 51/046* (2013.01); *H04L 51/32* (2013.01)

(58) Field of Classification Search
None
See application file for complete search history.

(56) References Cited

U.S. PATENT DOCUMENTS 6,199,102 B1 *   3/2001   Cobb ................ H04L 51/12
                                                    709/202
7,995,524 B2     8/2011   Lin
(Continued)

FOREIGN PATENT DOCUMENTS

CN       1852107 A      10/2006
CN     101089817 A      12/2007
(Continued)

OTHER PUBLICATIONS

English Version of International Search Report of International Patent Application No. PCT/CN2015/071311 from the State Intellectual Property Office of China, dated Jul. 6, 2015.
(Continued)

*Primary Examiner* — Mohamed Ibrahim
(74) *Attorney, Agent, or Firm* — Finnegan, Henderson, Farabow, Garrett & Dunner LLP

(57) ABSTRACT

A method for transferring a message includes receiving a message passing request. The message passing request includes a message to be passed, first information regarding a source account generating the message to be passed, and second information regarding a target account of the message to be passed. The method also includes determining a message passing path from the source account to the target account according to stored association relationships between user accounts. The message passing path includes at least one relay user account. The method further includes transferring the message to be passed to the target account through the message passing path.

15 Claims, 14 Drawing Sheets

(56) References Cited

U.S. PATENT DOCUMENTS

| | | | |
|---|---|---|---|
| 8,380,803 B1* | 2/2013 | Stibel | G06Q 30/0255 |
| | | | 705/319 |
| 8,605,671 B2 | 12/2013 | Lin | |
| 2003/0105827 A1* | 6/2003 | Tan | G06Q 10/107 |
| | | | 709/206 |
| 2008/0003977 A1* | 1/2008 | Chakiris | G06Q 20/10 |
| | | | 455/407 |
| 2008/0062904 A1 | 3/2008 | Lin | |
| 2010/0098231 A1* | 4/2010 | Wohlert | H04M 3/436 |
| | | | 379/207.15 |
| 2011/0249614 A1 | 10/2011 | Lin | |
| 2013/0073473 A1* | 3/2013 | Heath | G06Q 30/02 |
| | | | 705/319 |
| 2013/0254295 A1 | 9/2013 | Lee | |

FOREIGN PATENT DOCUMENTS

| | | |
|---|---|---|
| CN | 101141175 A | 3/2008 |
| CN | 102769495 A | 11/2012 |
| CN | 102801691 A | 11/2012 |
| CN | 102957778 A | 3/2013 |
| CN | 103870578 A | 6/2014 |
| CN | 104243288 A | 12/2014 |
| JP | 11-505099 A | 5/1999 |
| JP | 2010199871 A | 9/2010 |
| KR | 1020100077731 | 3/2012 |
| KR | 1020120036150 | 4/2012 |
| RU | 2442288 C2 | 2/2012 |
| WO | WO 2007/066386 A1 | 6/2007 |
| WO | WO 2014/087500 A1 | 6/2014 |

OTHER PUBLICATIONS

Notification regarding Results of Examination on Patentability dated Sep. 21, 2016 in counterpart Russian Application No. 2015113775/08(021600) and English translation thereof.

Kubo et al., "Reduction of Psychological Forwarding Cost Using Social Links in Mobile P2P Multicast", the Institute of Electronics, Information and Communication Engineers, IEICE Technical Report, Jul. 1, 2010, pp. 13-18.

International Search Report of PCT Application No. PCT/CN2015/071311, dated Jul. 6, 2015, issued by the State Intellectual Property Office of P.R. China as ISA (4 pages).

* cited by examiner

METHOD AND DEVICE FOR TRANSFERRING MESSAGES

CROSS-REFERENCE TO RELATED APPLICATIONS

This application is a continuation of International Application No. PCT/CN2015/071311 with an international filing date of Jan. 22, 2015, which is based upon and claims priority to Chinese Patent Application No. 201410521744.8, filed Sep. 30, 2014, the entire contents of both of which are incorporated herein by reference.

TECHNICAL FIELD

The present disclosure relates to communication technologies and, more particularly, to a method and a device for transferring a message, and an electronic apparatus.

BACKGROUND

Based on information exchange technologies such as instant messaging (IM), a user can initiate an association establishing request to another userinformation exchange. If the other user accepts the request, then an association relationship can be established between the two users. That is, the two users become "friends". However, it is more possible for users to become friends if they know each other in the real world. People tend to reject or neglect the association establishing request initiated by an unknown user, which makes it difficult to realize information exchange between users unknown to each other.

SUMMARY

In accordance with the present disclosure, there is provided a method for transferring a message. The method includes receiving a message passing request. The message passing request includes a message to be passed, first information regarding a source account generating the message to be passed, and second information regarding a target account of the message to be passed. The method also includes determining a message passing path from the source account to the target account according to stored association relationships between user accounts, the message passing path including at least one relay user account. The method further includes transferring the message to be passed to the target account through the message passing path.

Also in accordance with the present disclosure, there is provided a method for transferring a message. The method includes sending information regarding a target account to a server through a logged-in account, receiving a message passing path from the logged-in account to the target account determined by the server according to stored association relationships between user accounts, and transferring a message to be passed to the target account through the message passing path. The message passing path includes at least one relay user account.

Also in accordance with the present disclosure, there is provided a method for transferring a message. The method includes receiving a message relay request by a local account logged in a terminal. The message relay request is sent from an associated user account and includes information regarding a message passing path and a message to be passed. The method also includes displaying the message passing path and the message to be passed when the local account is a target account in the message passing path. When the local account is a relay user account in the message passing path, the method further includes sending the message relay request to a user account that is next to the local account in the message passing path, if a preset user operation is detected.

Also in accordance with the present disclosure, there is provided an electronic apparatus including a processor and a non-transitory computer-readable storage medium storing instructions. The instructions, when executed by the processor, cause the processor to receive a message passing request. The message passing request includes a message to be passed, first information regarding a source account generating the message to be passed, and second information regarding a target account of the message to be passed. The instructions also cause the processor to determine a message passing path from the source account to the target account according to stored association relationships between user accounts, and transfer the message to be passed to the target account through the message passing path. The message passing path includes at least one relay user account.

Also in accordance with the present disclosure, there is provided an electronic apparatus including a processor and a non-transitory computer-readable storage medium storing instructions. The instructions, when executed by the processor, cause the processor to send information regarding a target account to a server through a logged-in account, receive a message passing path from the logged-in account to the target account determined by the server according to stored association relationships between user accounts, and transfer a message to be passed to the target account through the message passing path. The message passing path includes at least one relay user account.

Also in accordance with the present disclosure, there is provided an electronic apparatus including a processor and a non-transitory computer-readable storage medium storing instructions. The instructions, when executed by the processor, cause the processor to receive a message relay request by a local account logged in the electronic apparatus. The message relay request is sent from an associated user account and includes information regarding a message passing path and a message to be passed. The instructions also cause the processor to display the message passing path and the message to be passed when the local account is a target account in the message passing path. When the local account is a relay user account in the message passing path, the instructions further cause the processor to send the message relay request to a user account that is next to the local account in the message passing path if a preset user operation is detected.

Also in accordance with the present disclosure, there is provided a non-transitory computer-readable storage medium storing instructions. The instructions, when executed by a processor in a device, cause the device to receive a message passing request. The message passing request includes a message to be passed, first information regarding a source account generating the message to be passed, and second information regarding a target account of the message to be passed. The instructions further cause the device to determine a message passing path from the source account to the target account according to stored association relationships between user accounts. The message passing path includes at least one relay user account. The instructions further cause the processor to transfer the message to be passed to the target account through the message passing path.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
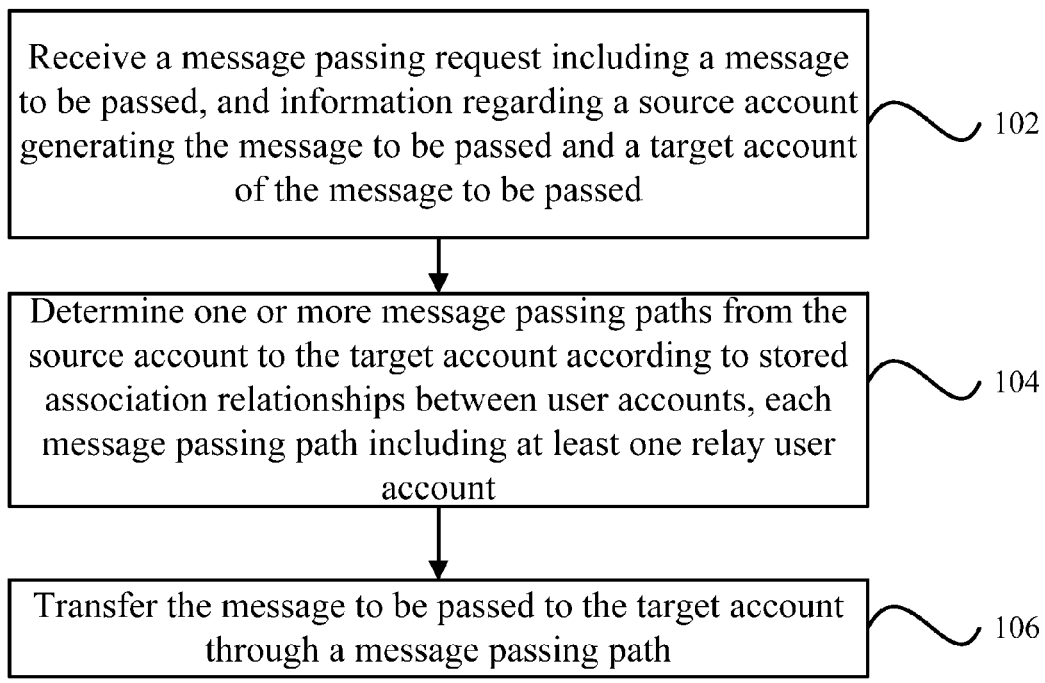
FIG. 1 is a flow chart showing a server-side method for transferring a message according to an exemplary embodiment.

FIG. 1 is a flow chart showing an exemplary method for transferring a message consistent with embodiments of the disclosure. The method can be implemented in a server. As shown in FIG. 1, at 102, a message passing request is received. The message passing request includes a message to be passed, information regarding a source account generating the message to be passed and a target account of the message to be passed.

In some embodiments, the target account is an account of an unknown user with whom a user wishes to interact, such as the account of a public figure. Since the user has not established an association relationship with the target account, the information exchange manner in related arts cannot ensure that the user sends interaction information to the target account or the sent interaction information may be neglected by the target account. That is, the related arts cannot ensure a normal interaction between users unknown to each other.

In some embodiments, methods according to the present disclosure can be implemented using a certain APP, such as MiChat, installed on a terminal. Such function may be referred to as a "Message Passing" function. In the APP, the user logs on using his/her account, determines the account of an unknown user, and inputs the interaction information to be sent, and then initiates a corresponding message passing request to a server by starting the "Message Passing" function. The message passing request includes a "Message to be Passed," i.e., the interaction information that the user wishes to send to the unknown user, a "Source Account," i.e., the account of the user who logs into the APP, and a "Target Account," i.e., the account of the unknown user with whom the user wishes to interact.

In some embodiments, the user may directly input the account of the unknown user. In some embodiments, the user may look up the account of the unknown user in a contact list, or acquire the account of the unknown user through a "Searching" function. Then in a corresponding application interface, a "Message Passing" function button may be displayed in an association area of the account of the unknown user. The user may select that function button and then enter message to be passed to initiate a message passing request targeting the unknown user to the server.

In some embodiments, the message passing request received by the server may be sent in a cleartext. In some embodiments, the message passing request received by the server may be sent in a ciphertext to improve information security. The terminal can use a password obtained through pre-negotiation with the server, to perform an encryption operation on the message passing request or information therein.

According to the present disclosure, the message to be passed may include message contents of various forms, such as text, pictures, links, or the like.

At 104, one or more message passing paths from the source account to the target account are determined according to stored association relationships between user accounts. Each message passing path includes at least one relay user account.

Since networks of different users may be different, a communication between any two users unknown to each other may be established as a result of overlapping between the networks of different users. For example, the "Six Degrees of Separation" theory shows that any two users unknown to each other may be separated by five users at most. Therefore, a message passing path from the source account to the target account may be established on the basis of the "passing" effect among the networks of different users. A user account between the source account and the target account in the message passing path, i.e., a relay user account, serves to realize a "relay" function.

At 106, the message to be passed is transferred to the target account through a message passing path. That is, although there is no direct association relationship between the source account and the target account, an indirect association relationship can be established between the source account and the target account based on the message passing path. Thus, information exchange between users unknown to each other can be realized.

Figure 2:
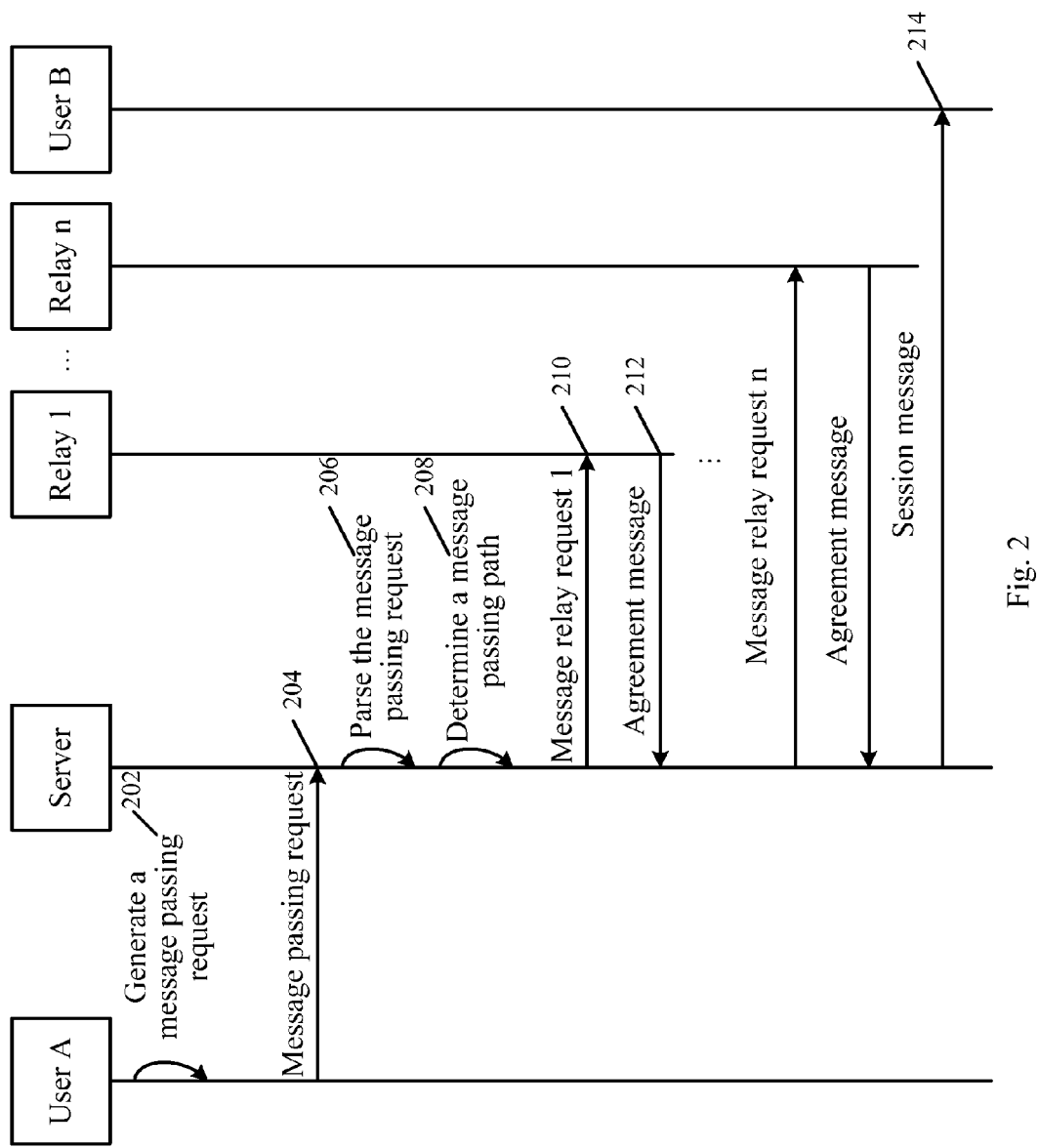
FIG. 2 is a flow chart showing a method for transferring a message according to an exemplary embodiment.

FIG. 2 is a flow chart showing an exemplary method for transferring a message consistent with embodiments of the present disclosure. In FIG. 2, it is assumed that accounts of a user A and a user B were not previously associated on a server. As shown in FIG. 2, at 202, when the user A wishes to send interaction information to the user B, a message passing request is generated. The message passing request includes the account of the user A, the account of the user B, and an interaction message that the user A wishes to send to the user B.

In some embodiments, the user A logs into his/her account on a terminal, designates the account of the user B on the terminal, and inputs the interaction message to be sent to the user B, so as to generate the message passing request. In the message passing request, the account of the user A is a source account, the account of the user B is a target account, and the interaction message that the user A wishes to send to the user B serves as a message to be passed during this "message passing" operation.

At 204, the user A sends the message passing request to the server.

At 206, the server parses the received message passing request, and acquires the source account, the target account, and the message to be passed.

At 208, according to stored association relationships between user accounts, the server determines a message passing path with the source account being a start node and the target account being a terminal node. There is at least one relay user account serving as a relay node between the start node and the terminal node, so that the "message passing" operation can be performed. A direct association relationship exists between adjacent relay user accounts.

Figure 3:
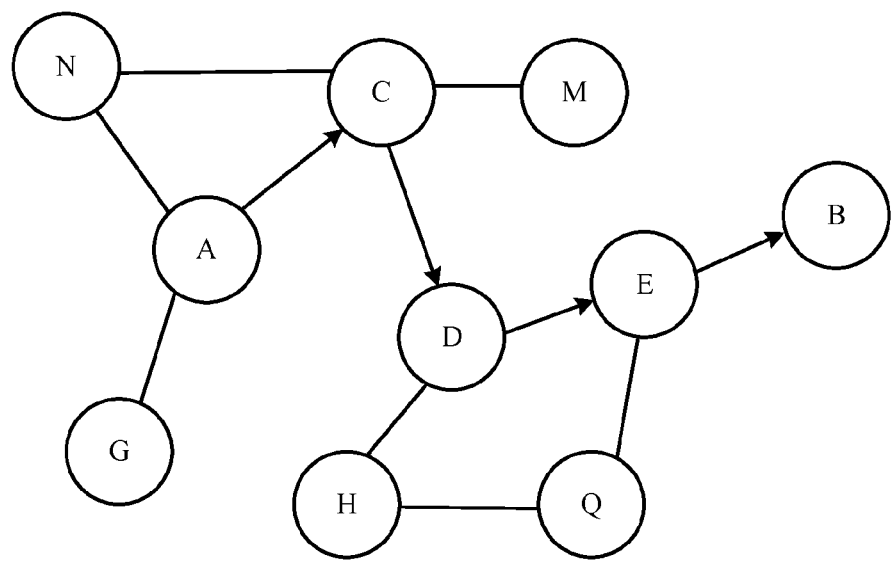
FIG. 3 is a schematic diagram showing association relationships between user accounts according to an exemplary embodiment.
Figure 4:
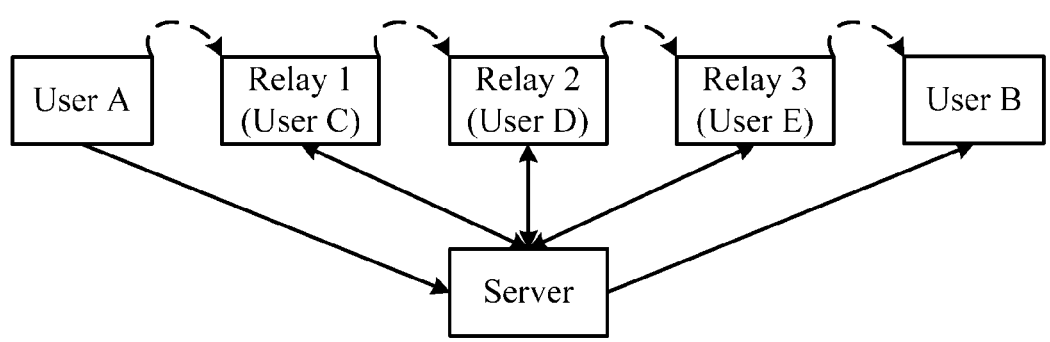
FIG. 4 is a schematic diagram showing a message passing path according to an exemplary embodiment.

For example, FIG. 3 is a schematic diagram showing association relationships between user accounts, such as accounts of a user A, a user B, a user C, a user D, a user E, a user G, a user H, a user M, a user N, and a user Q, consistent with embodiments of the present disclosure. Each connection line in FIG. 3 represents a direct association relationship between two users. Aa shown in FIG. 3, although a direct association relationship does not exist between the user A and the user B, an indirect association between the user A and the user B can be realized through the "passing" effects of the association relationships between the user A and other users, the association relationships between the user B and other users, and the association relationships between other users. For example, FIG. 4 shows such an indirect association: user A→user C→user D→user E→user B, which constitutes a message passing path with the account of the user A being the start node and the account of the user B being the terminal node.

Referring again to FIG. 2, at 210, according to the determined message passing path, the server sends a message relay request 1 to the first relay user account (referred to as "Relay 1"). Assume that Relay 1 is the account of the user C. If the user C agrees to relay, the server continues to inquire the next relay user account. If the user C refuses to relay, the server may: 1) terminate this message passing operation; 2) switch to another message passing path if there exists one; and 3) request the user A to decide whether to terminate the current message passing operation, switch to another message passing path, or reinitiate a request to the user C.

At 212, if Relay 1 agrees to relay, it returns an agreement message to the server. Alternatively, if Relay 1 does not agree to relay, it can return a rejection message to the server.

In some embodiments, after receiving the agreement or rejection message returned by each relay user account, the server may notify the user A, so that the user A knows the current execution state of the current message passing operation.

After the server receives the agreement message returned by Relay 1, if the next stage user account in the message passing path next to Relay 1 is still a relay user account, the server sends another message relay request to the next stage user account, i.e., the processes in 210 and 212 are repeated with respect to the next stage user account. For example, as shown in FIG. 4, the user D serves as Relay 2, and the server sends a message relay request 2 to Relay 2. The processes in 210 and 212 are repeated until the server sends a message passing request n to the last stage relay user account, i.e., Relay n and receives an agreement message returned by Relay n, as shown in FIG. 2. Thereafter, the process proceeds to 214.

At 214, when all the relay user accounts in the message passing path agree to pass the message, the server sends a session message to the user B. In some embodiments, the session message may include a message to be passed that the user A wishes to send to the user B and information regarding the message passing path. As such, the user B can understand that, although the user B and the user A are not "friends," there exists an indirect association relationship between the user B and the user A, based on the friend relationship between the user B and the last stage relay user account, i.e., Relay n, in the message passing path, and the friend relationship between adjacent user accounts in the message passing path. Thus, abruptness that may be caused by the message passing operation is reduced and thereby influences caused to the user B are avoided.

According to the present disclosure, the server generates the message passing path and sends message relay requests to the user accounts in the message passing path, so that users unknown to each other can finally realize information exchange when the message relay requests are agreed to. Taking the message passing path as shown in FIG. 4 as an example, from the viewpoints of the user A and the user B, the message is sent by the user A to the user B via a path of "user A→user C→user D→user E→user B." But actually, after the server sends the message relay requests to the relay user accounts and all of the relay user accounts agree to relay, the server directly sends the message to be passed from the user A to the user B.

Figure 5:
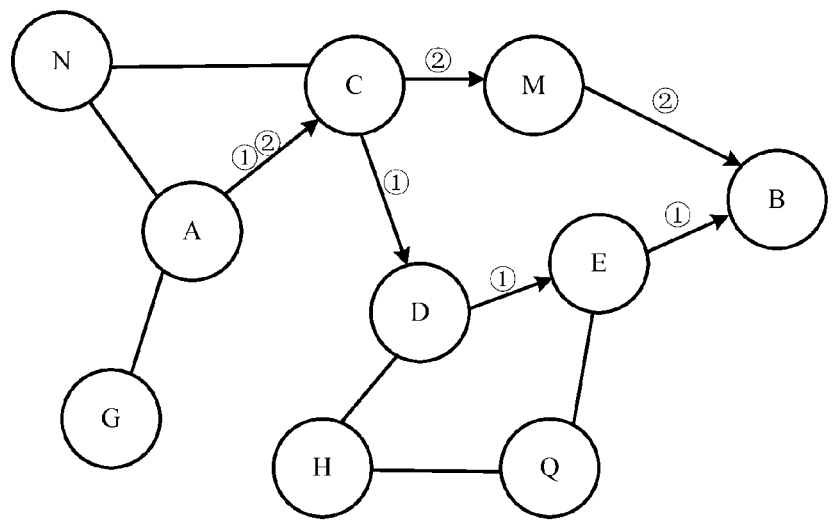
FIG. 5 is a schematic diagram showing association relationships between user accounts according to another exemplary embodiment.
Figure 6:
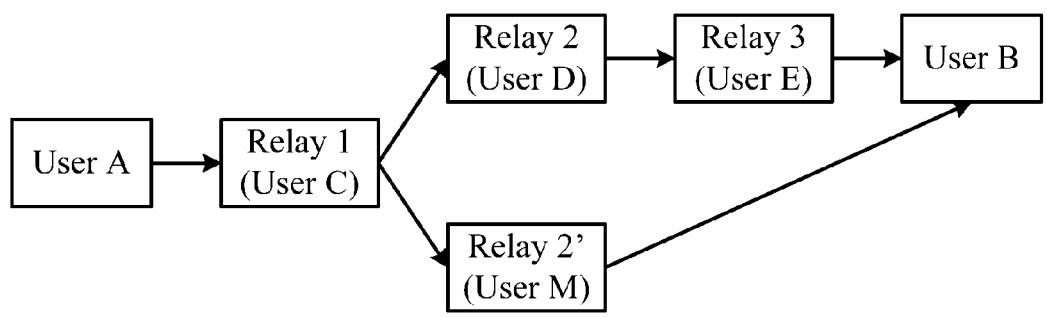
FIG. 6 is a schematic diagram showing another message passing path according to an exemplary embodiment.

According to the present disclosure, a plurality of message passing paths that have the account of the user A as the start node and the account of the user B as the terminal node may be determined at 208 in FIG. 2. An example of multiple message passing paths is shown in FIG. 5. FIG. 5 is similar to FIG. 3, except that in FIG. 5, there exists an account association relationship between the user M and the user B. As shown in FIG. 5, two message passing paths may exist:

path ①: user A→user C→user D→user E→user B, in which three relays, i.e., the user C, the user D, and the user E, are included; and path ②: user A→user C→user M→user B, in which two relays, i.e., the user C and the user M, are included. These two message passing paths are schematically shown in FIG. 6. In some embodiments, the server selects the message passing path having the smallest number of relay user accounts. For example, the above path ① includes three relay user accounts while the path ② includes two relay user accounts, and thus the server may choose the path ② to improve the efficiency of message passing.

Figure 7:
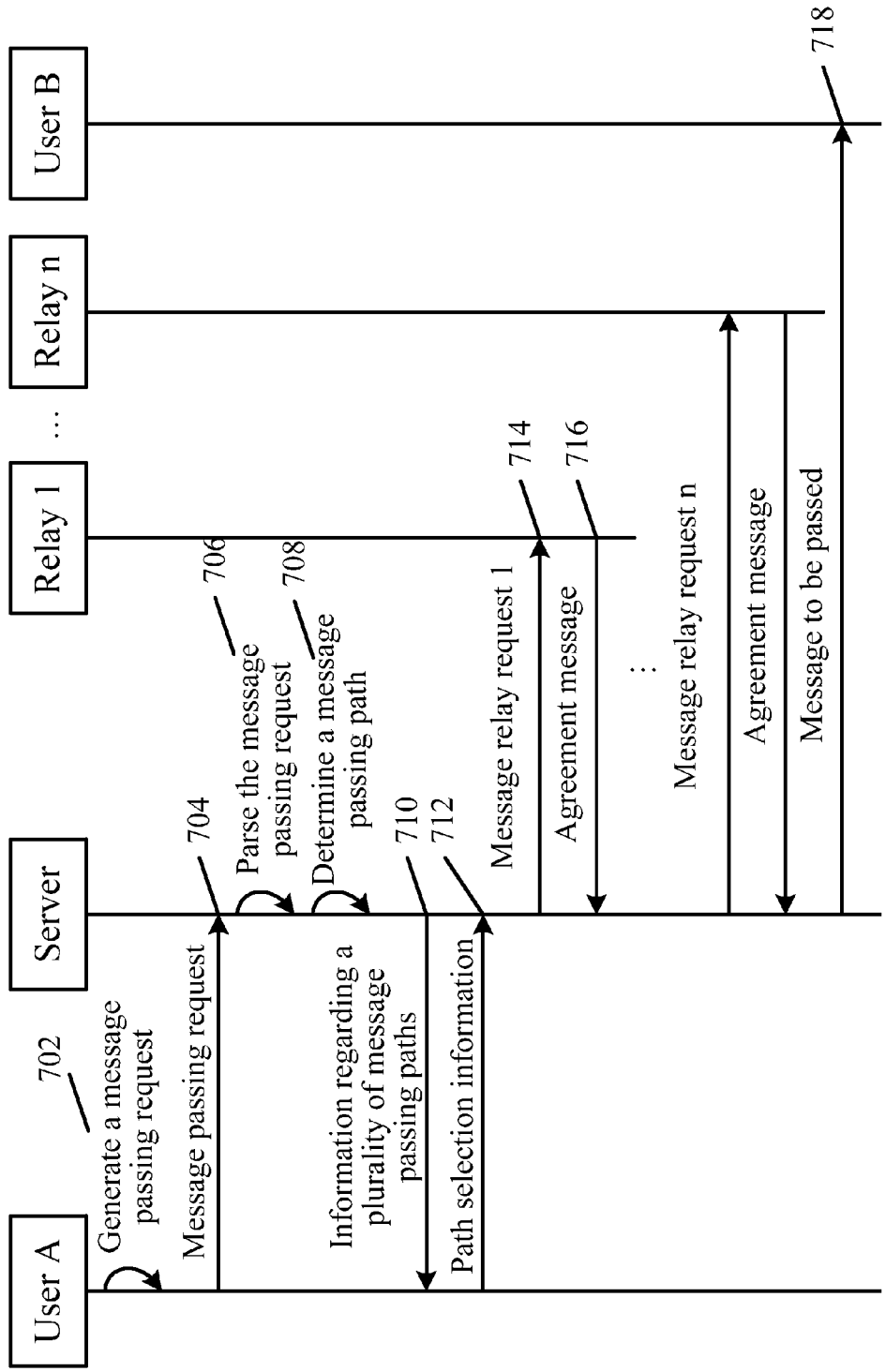
FIG. 7 is a flow chart showing another method for transferring a message according to an exemplary embodiment.

FIG. 7 is a flow chart showing another exemplary method for transferring a message consistent with embodiments of the present disclosure. In FIGS. 7, 702 to 708 are similar to 202 to 208 shown in FIG. 2, and thus detailed descriptions thereof are omitted.

At 710, if the server determines that a plurality of message passing paths, such as path ① and path ② above, exist, it sends information regarding the plurality of message passing paths to the user A. The server can send only the number of relay user accounts or the number of all user accounts in each message passing path, or send detailed information such as the user accounts included in each message passing path and the association relationships between the user accounts.

At 712, the server receives path selection information returned by the user A, and determines the message passing path that the user A wishes to use according to the path selection information. Then, 714 to 718 are performed. 714 to 718 are similar to 210 to 214 in FIG. 2, and thus detailed descriptions thereof are omitted.

Figure 8:
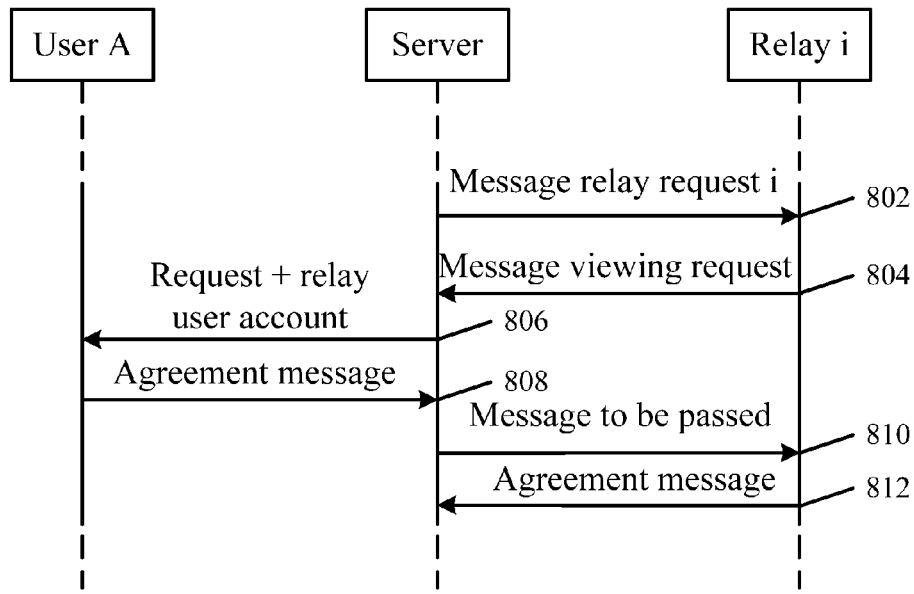
FIG. 8 is a flow chart showing another method for transferring a message according to an exemplary embodiment.

FIG. 8 is a flow chart showing another exemplary method for transferring a message consistent with embodiments of the present disclosure. As shown in FIG. 8, at 802, the server sends a message relay request i to a relay account, Relay i, according to the selected message passing path.

At 804, the server receives a message viewing request returned from Relay i. That is, the message relay request i only sends the "request" itself to Relay i and does not include the message to be passed input by the user A. However, a user i who is associated with Relay i may want to know the content of the message to be passed to ensure that message to be passed will not harass the target account. Therefore, Relay i can send the message viewing request to the server to acquire the detailed message to be passed.

At 806, the server sends the message viewing request and the user account of Relay i to the user A, notifying the user A of the information that "Relay i wants to view the contents of the message to be passed." The server may directly forward the message viewing request from Relay i to the user A, or may generate a new message viewing request and send the new message viewing request to the user A.

At 808, the server receives an agreement message returned by the user A.

At 810, the server sends the contents of the message to be passed to Relay i.

In an alternative scenario, the user A does not wish to allow Relay i to view the contents of the message to be passed. In this situation, the server receives a rejection message returned by the user A and sends the rejection message to Relay i, letting Relay i decide whether to perform the message passing operation.

At 812, the server receives an agreement message returned from Relay i and performs subsequent processing, detailed descriptions of which are omitted here.

Figure 9:
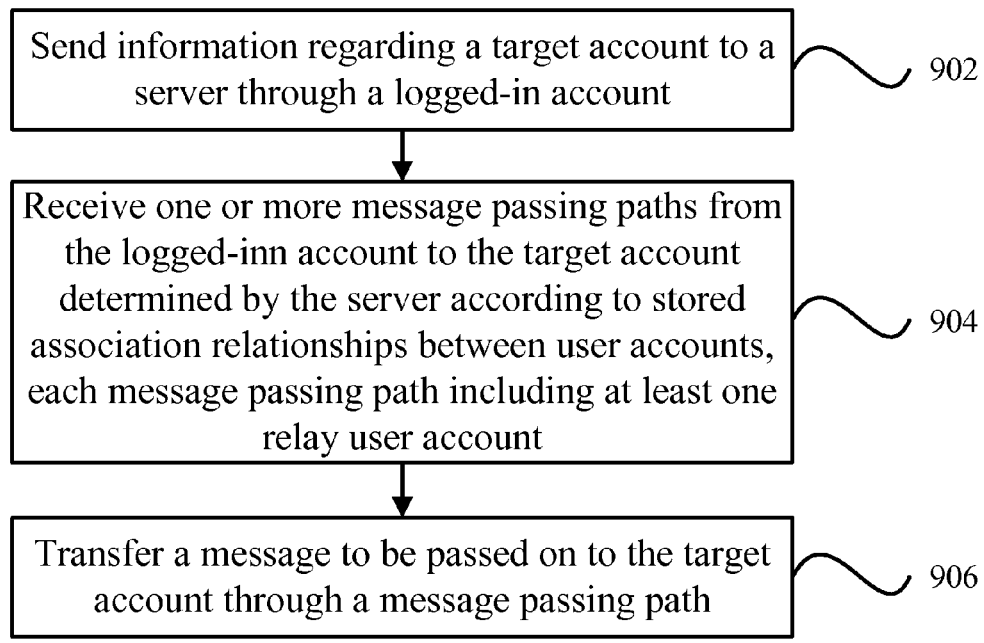
FIG. 9 is a flow chart showing a terminal-side method for transferring a message according to an exemplary embodiment.

FIG. 9 is a flow chart showing another exemplary method for transferring a message consistent with embodiments of the present disclosure. This method can be implemented in a terminal. As shown in FIG. 9, at 902, information regarding a target account is sent to a server by a logged-in account. In some embodiments, after logging into his/her account in an APP on a terminal, a user can send an interaction message to an unknown user by triggering a "Message Passing" function of the APP. To do this, the user needs to notify the server of a target account to which he/she wishes to send the message, so that the server can determine a corresponding message passing path.

In some embodiments, the user may directly input the account of the unknown user. In some embodiments, the user may look up the account of the unknown user in a contact list, or acquire the account of the unknown user through a "Searching" function. Then in a corresponding application interface, a "Message Passing" function button may be displayed in an association area of the account of the unknown user. The user may select that function button and then enter a message to be passed to initiate a message passing request targeting the unknown user to the server.

At 904, one or more message passing paths from the logged-in account to the target account are received. The one or more message passing paths are determined by the server according to stored association relationships between user accounts. Each message passing path includes at least one relay user account. That is, based on the association relationships between the user accounts established in advance, an indirect association relationship, i.e., a message passing path, between accounts unknown to each other can be established through the passing of the relationships between a plurality of stages of relay user accounts, and an established direct association relationship exists between each pair of adjacent user accounts in the message passing path.

At 906, a message to be passed is transferred to the target account through a message passing path. If there is only one message passing path, the message to be passed can be directly transferred through that message passing path. If there are a plurality of message passing paths, the terminal may randomly select a message passing path or select a message passing path having the smallest number of relay user accounts, i.e., having the smallest number of total user accounts. Alternatively, the user may select a message passing path that he/she wishes to use for transferring the message to be passed.

In some embodiments, a message relay request can be sent to a first relay user account in the selected message passing path and passed to the target account through all the relay user accounts included in the message passing path. The message relay request includes information regarding the selected message passing path and the message to be passed.

The exemplary method shown in FIG. 9 differs from that shown in FIG. 1 in that, the message to be passed is directly transferred between respective user accounts, and the respective user accounts do not merely receive and respond to the message relay request initiated by the server. For example, as shown in FIG. 10, assuming the selected message passing path is "user A→user C→user D→user E→user B," interaction operations include: 1) interaction between the terminal used by the user A and the server, including the user A sending the target account to the server and the server returning a corresponding message passing path; and 2) transferring of the message relay request between the user accounts in the message passing path.

In some embodiments, the message relay request includes the message to be passed and the information regarding the message passing path. The user account receiving the message relay request may be a relay user account or the target account.

Figure 10:
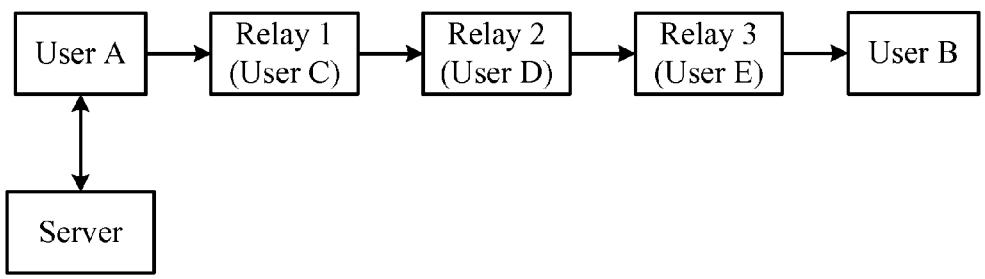
FIG. 10 is a schematic diagram showing another message passing path according to an exemplary embodiment.

When the account receiving the message relay request is a relay user account, for example, the relay 1 (the user C), the relay 2 (the user D), or the relay 3 (the user E) as shown in FIG. 10, if the relay user account agrees to relay the message, it sends the message relay request the next stage user account. For example, when a terminal of the user C receives the message relay request from the user A, the terminal does not yet know it is a "relay" and, by viewing the information regarding the message passing path in the message relay request, the terminal knows that its role in this message passing operation is the "relay 1," and the next stage is the user D. Thus, if the user of the terminal agrees to the request, the terminal sends the message relay request to the user D. Similarly, if the user D agrees to the received message relay request, the terminal of the user D passes on the message relay request to the user E, and so on.

When the account receiving the message relay request is the target account, a terminal of the target account displays the information regarding the message passing path and the message to be passed in the message relay request. For example, when the relay 3 agrees to the message relay request passed from the relay 2, the relay 3 sends the message relay request to the user B, and a terminal of the user B determines that the account of the user B is the target account by checking the information of the message passing path, and then displays the information regarding the message passing path and the message to be passed on a screen of the terminal for the user B to view.

The message relay request can be forwarded by the server, or transferred directly through, for example, a peer to peer communication without being forwarded by the server.

Figure 11:
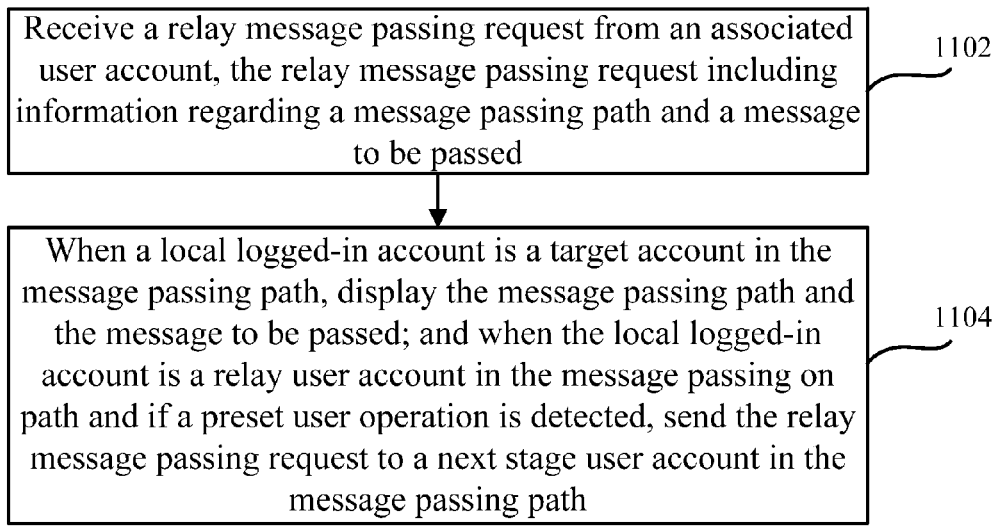
FIG. 11 is a flow chart showing another terminal-side method for transferring a message according to an exemplary embodiment.

FIG. 11 shows an exemplary method for processing a message relay request consistent with embodiments of the present disclosure. This method can be implemented on a terminal. As shown in FIG. 11, at 1102, a message relay request from an associated user account is received. The message relay request includes information regarding a message passing path and a message to be passed.

At 1104, a corresponding processing approach is employed according to the type of the local logged-in account in the message passing path. If the local logged-in account is a target account in the message passing path, the message passing path and the message to be passed are displayed. On the other hand, if the local logged-in account is a relay user account in the message passing path and a preset user operation is detected, the message relay request is sent to a next stage user account in the message passing path.

Figure 12:
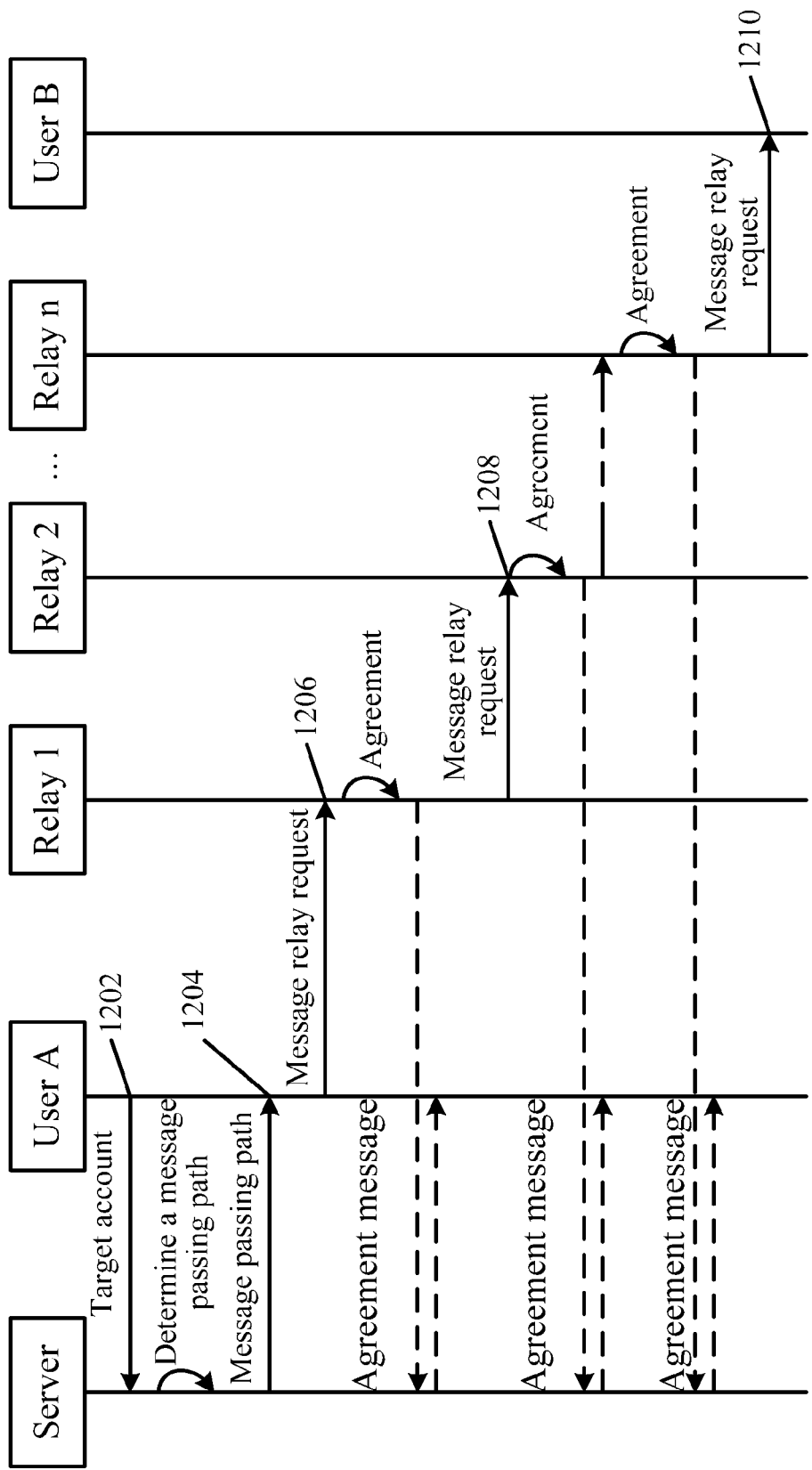
FIG. 12 is a flow chart showing a method for transferring a message according to an exemplary embodiment.

FIG. 12 is a flow chart showing another exemplary method for transferring a message consistent with embodiments of the present disclosure. As shown in FIG. 12, at 1202, when a user A needs to initiate a message passing operation, it sends a target account, such as an account of a user B, to a server. The server determines a message passing path with the account of the user A being a source account and the account of the user B being the target account according to the accounts of the user A and the user B as well as stored association relationships between user accounts.

At 1204, the server sends the determined message passing path to a terminal corresponding to the account of the user A. If there is only one message passing path, the user A can directly perform the message passing operation. If there are a plurality of message passing paths, one message passing path needs to be selected therefrom for the current message passing operation.

At 1206, according to the selected message passing path, the user A sends a message relay request to a first relay user account. For example, if the first relay user account is a relay 1, the user A sends the message relay request to the relay 1. The relay 1 can agree to or reject the received message relay request. If the relay 1 rejects, the process ends. Alternatively, the relay 1 can return a rejection message to the user A, and the user A determines whether to terminate the current message transferring operation, to resend the message relay request, or to switch to another message passing path. On the other hand, if the relay 1 agrees to the message relay request, the process proceeds to 1208. Meanwhile, the relay 1 can send an agreement message to the server for the server to return the agreement message to the user A, or can directly send the agreement message to the user A.

At 1208, the relay 1 forwards the message relay request to a relay 2, and the relay 2 performs operations similar to the foregoing operations performed by the relay 1. According to the present disclosure, each relay user account receiving the message relay request performs operations similar to the operations performed by the relay 1 in 1206, and thus the detailed descriptions thereof are omitted here.

At 1210, if all the relay user accounts agree to the received message relay request, the user B receives the relay message passing request from a relay n. By parsing the information regarding the message passing path in the obtained message relay request, the terminal of the user B determines that the user B is the target account of the current message passing operation, and displays the parsed information regarding the message passing path and the message to be passed on a screen of the terminal.

Figure 13:
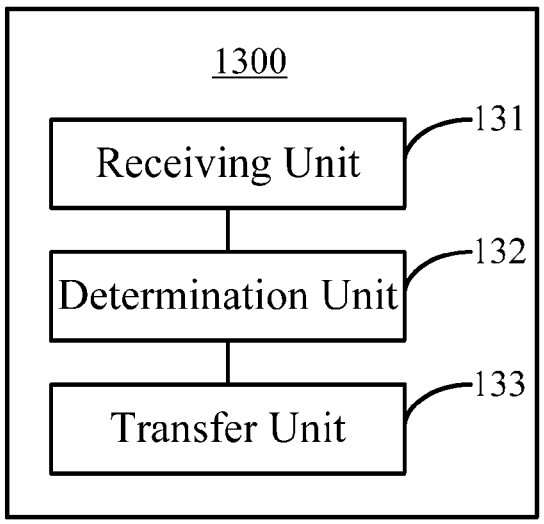
FIGS. 13-19 are block diagrams showing devices implemented in a server for transferring a message according to exemplary embodiments.

FIG. 13 is a block diagram showing an exemplary device 1300 for transferring a message consistent with embodiments of the present disclosure. The device 1300 includes a receiving unit 131, a determination unit 132, and a transfer unit 133.

The receiving unit 131 is configured to receive a message passing request. The message passing request includes a message to be passed, and information regarding a source account generating the message to be passed and a target account of the message to be passed.

The determination unit 132 is configured to determine one or more message passing path from the source account to the target account according to stored association relationships between user accounts. Each message passing path includes at least one relay user account. An association relationship exists between adjacent user accounts in the message passing path.

The transfer unit 133 is configured to transfer the message to be passed to the target account through a message passing path.

Figure 14:
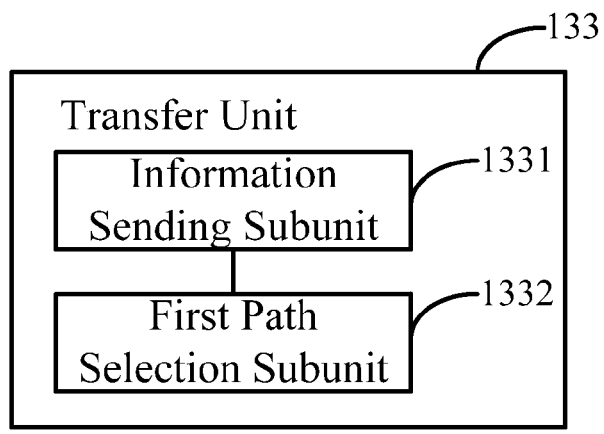

FIG. 14 is a block diagram showing an example of the transfer unit 133. As shown in FIG. 14, the transfer unit 133 includes an information sending subunit 1331 and a first path selection subunit 1332. The information sending subunit 1331 is configured to, when a plurality of message passing paths exist, send information regarding the plurality of message passing paths to the source account. The first path selection subunit 1332 is configured to receive path selection information returned by the source account and select a message passing path corresponding to the path selection information to transfer the message to be passed to the target account.

Figure 15:
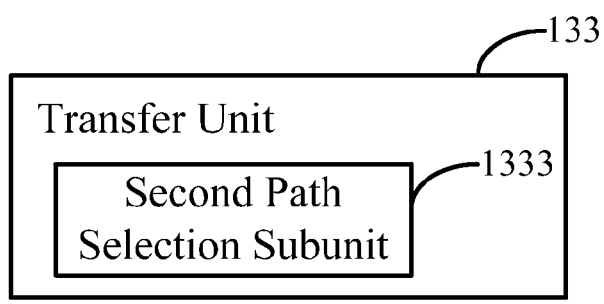

FIG. 15 is a block diagram showing another example of the transfer unit 133. As shown in FIG. 15, the transfer unit 133 includes a second path selection subunit 1333 configured to, when a plurality of message passing paths exist, select the message passing path having the smallest number of relay user accounts to transfer the message to be passed to the target account.

Figure 16:
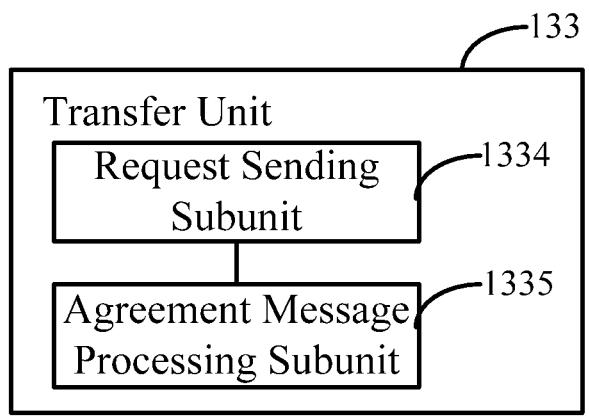

FIG. 16 is a block diagram showing a further example of the transfer unit 133. As shown in FIG. 16, the transfer unit 133 includes a request sending subunit 1334 and an agreement message processing subunit 1335. The request sending subunit 1334 is configured to send a message relay request to a relay user account in the message passing path. The agreement message processing subunit 1335 is configured to, when the relay user account returns an agreement message, if the account of the next stage is another relay user account, send the message relay request to the another relay user account, and if the account of the next stage is the target account, send a session message including the message to be passed to the target account.

Figure 17:
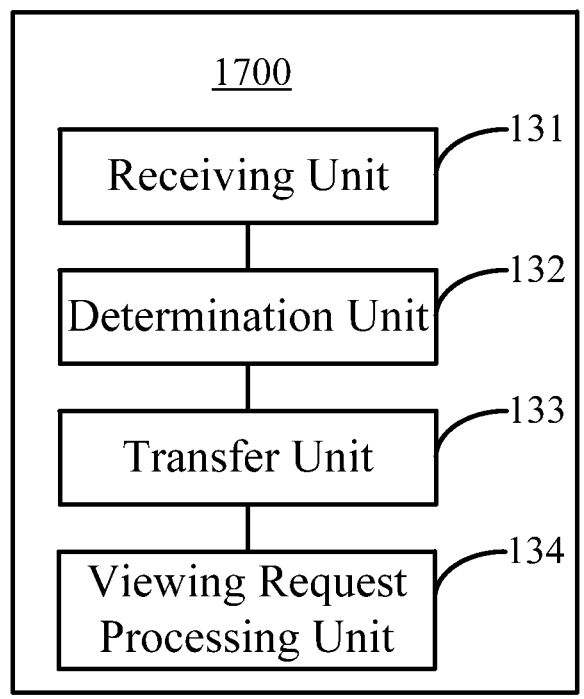

FIG. 17 is a block diagram showing another exemplary device 1700 for transferring a message consistent with embodiments of the present disclosure. The device 1700 is similar to the device 1300 shown in FIG. 13, except that the device 1700 further includes a viewing request processing unit 134 configured to, according to a message viewing request from the relay user account, send the message to be passed to the relay user account, or send the message viewing request and the relay user account to the source account, and send the message to be passed to the relay user account if the source account returns an agreement message. According to the present disclosure, the transfer unit 133 in the device 1700 can be any transfer unit consistent with embodiments of the present disclosure, such as one of those shown in FIGS. 14-16.

Figure 18:
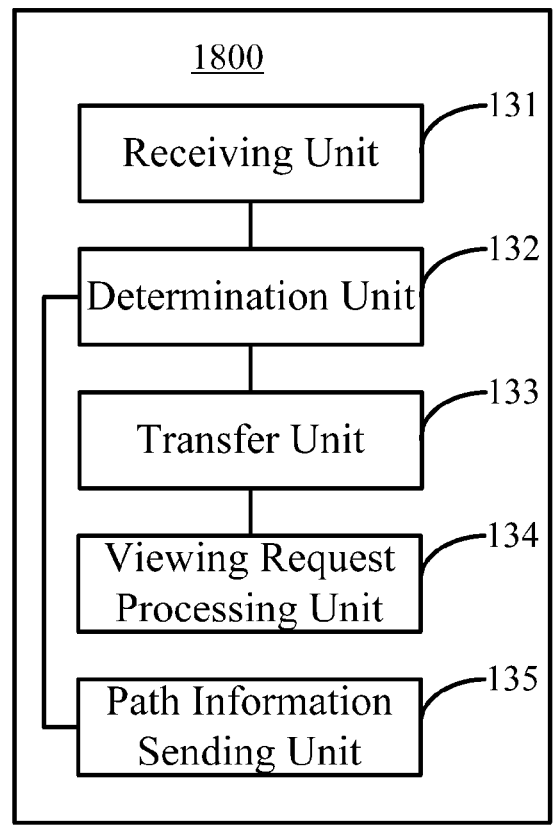

FIG. 18 is a block diagram showing another exemplary device 1800 for transferring a message consistent with embodiments of the present disclosure. The device 1800 is similar to the device 1700 shown in FIG. 17, except that the device 1800 further includes a path information sending unit 135 configured to send information regarding the message passing path to the target account.

Figure 19:
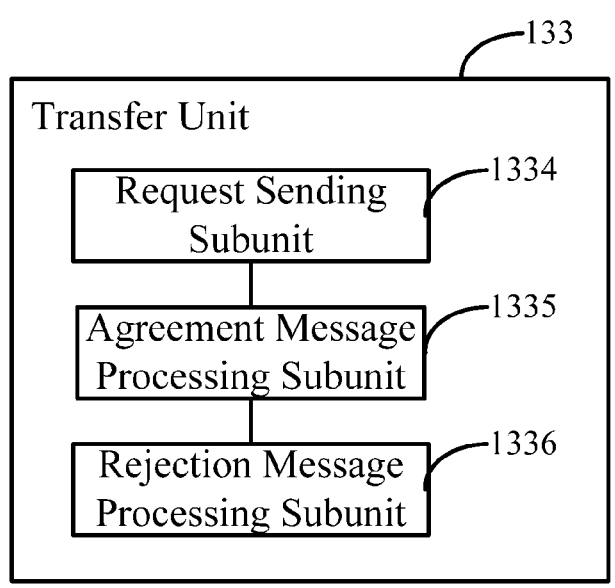

FIG. 19 is a block diagram showing another example of the transfer unit 133. The example of the transfer unit 133 shown in FIG. 19 is similar to that in FIG. 16, except that the example of the transfer unit 133 in FIG. 19 further includes a rejection message processing subunit 1336 configured to, when the relay user account returns a rejection message, switch to another message passing path and send the message to be passed to the target account through the another message passing path.

According to the present disclosure, there is also provided a device for transferring a message, including a processor and a memory storing instructions that, when executed by the processor, cause the processor to receive a message passing request including a message to be passed, and information regarding a source account generating the message to be passed and a target account of the message to be passed. The instructions also cause the processor to determine one or more message passing paths from the source account to the target account according to stored association relationships between user accounts. Each message passing path includes at least one relay user account. The instructions further cause the processor to transfer the message to be passed to the target account through a message passing path.

According to the present disclosure, there is also provided a terminal including a memory and one or more programs stored in the memory. The terminal further includes one or more processors configured to execute instructions in the one or more programs that include the following operations: receiving a message passing request including a message to be passed, and information regarding a source account generating the message to be passed and a target account of the message to be passed, determining one or more message passing paths from the source account to the target account according to stored association relationships between user accounts, with each message passing path including at least one relay user account, and transferring the message to be passed to the target account through a message passing path.

Figure 20:
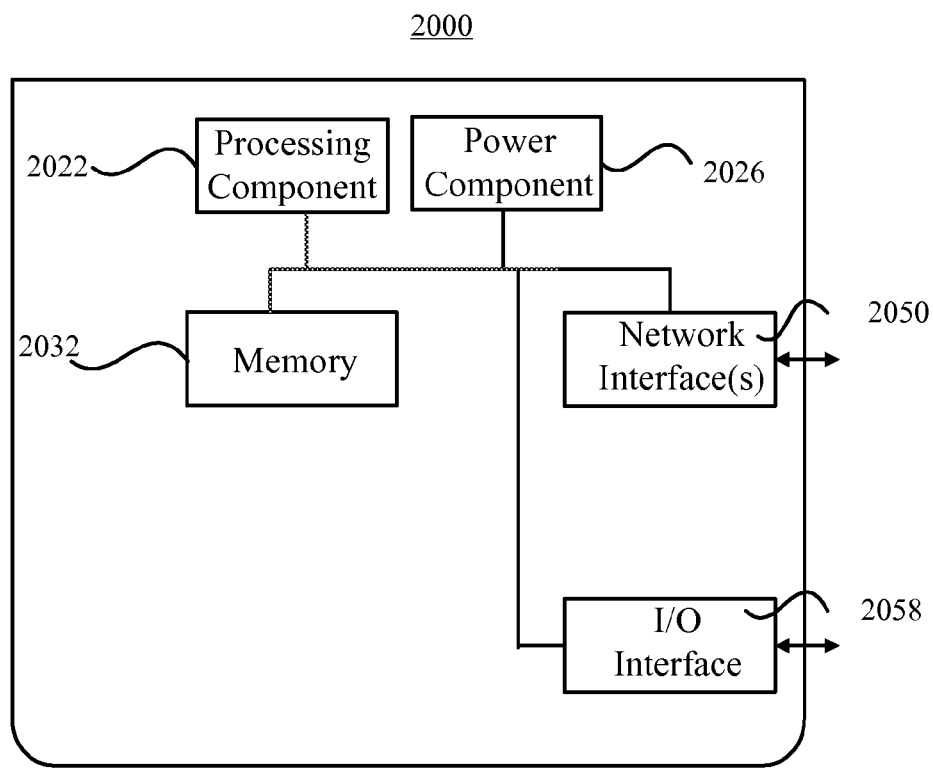
FIG. 20 is a block diagram showing a device implemented in a server for transferring a message according to another exemplary embodiment.

FIG. 20 is a block diagram showing an exemplary device 2000 for transferring a message consistent with embodiments of the present disclosure. For example, the device 2000 may be provided as a server. Referring to FIG. 20, the device 2000 includes a processing component 2022 including one or more processors, and memory resources represented by a memory 2032 for storing instructions executable by the processing component 2022, such as application programs. The application programs stored in the memory 2032 may include one or more modules each corresponding to a set of instructions. Further, the processing component 2022 is configured to execute the instructions to perform one or more of the above methods for transferring a message.

The device 2000 also includes a power component 2026 configured to perform power management of the device 2000, a wired or wireless network interface 2050 configured to connect the device 2000 to a network, and an input/output (I/O) interface 2058. The device 2000 can run an operating system stored in the memory 2032, such as Windows Server™, Mac OS X™, Unix™, Linux™, FreeBSD™, or the like.

Figure 21:
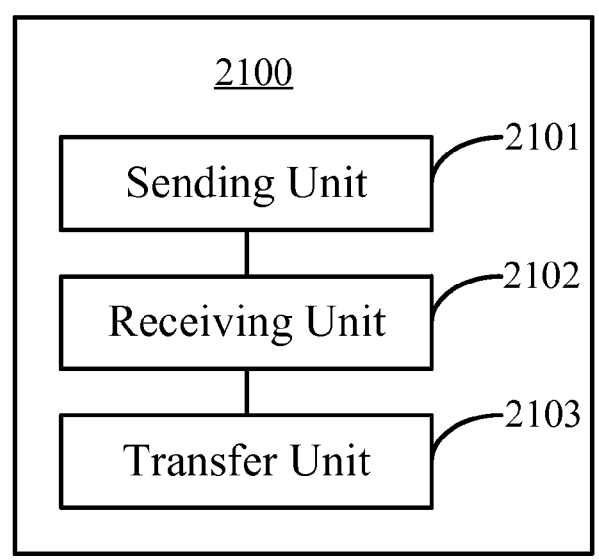
FIGS. 21-22 are block diagrams showing device implemented in a terminal for transferring a message according to an exemplary embodiment.

FIG. 21 is a block diagram showing another exemplary device 2100 for transferring a message consistent with embodiments of the present disclosure. Referring to FIG. 21, the device 2100 includes a sending unit 2101, a receiving unit 2102, and a transfer unit 2103. The sending unit 2101 is configured to send information regarding a target account to a server through a logged-in account. The receiving unit 2102 is configured to receive a message passing path from the logged-in account to the target account determined by the server according to stored association relationships between user accounts. The message passing path includes at least one relay user account. In the message passing path, the association relationship exists between adjacent user accounts. The transfer unit 2103 is configured to transfer the message to be passed to the target account through the message passing path.

Figure 22:
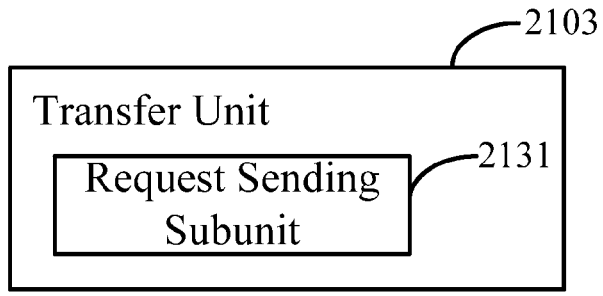

FIG. 22 is a block diagram showing an example of the transfer unit 2103. As shown in FIG. 22, the transfer unit 2103 includes a request sending subunit 2131 configured to send a message relay request to a first relay user account in the selected message passing path and send the message relay request to the target account through the at least one relay user account. The message relay request includes the information regarding the selected message passing path and the message to be passed.

When the account receiving the message relay request is a relay user account, if the receiving account agrees to the message relay request, it sends the message relay request to a next stage user account. When the account receiving the message relay request is the target account, a terminal associated with the target account displays the information regarding the message passing path and the message to be passed in the message relay request.

According to the present disclosure, there is also provided a device for transferring a message, including a processor and a memory storing instructions that, when executed by the processor cause the processor to send information regarding a target account to a server through a logged-in account, receive a message passing path from the logged-in account to the target account determined by the server according to stored association relationships between user accounts, with the message passing path including at least one relay user account, and transfer a message to be passed to the target account through the message passing path.

According to the present disclosure, there is also provided a terminal including a memory and one or more programs stored in the memory. The terminal further includes one or more processors configured to execute instructions in the one or more programs that include the following operations: sending information regarding a target account to a server through a logged-in account, receiving a message passing path from the logged-in account to the target account determined by the server according to stored association relationships between user accounts, with the message passing path including at least one relay user account, and transferring a message to be passed to the target account through the message passing path.

Figure 23:
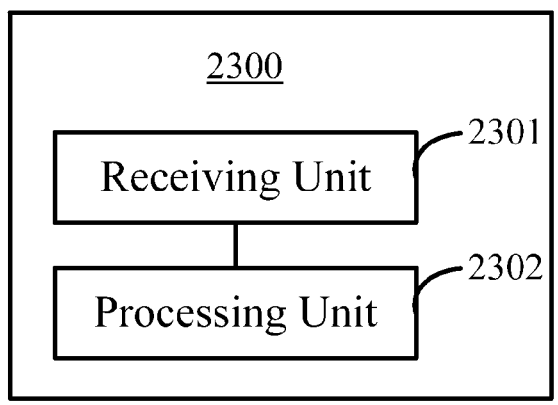
FIGS. 23-24 are block diagrams showing another device implemented in a terminal for transferring a message according to an exemplary embodiment.

FIG. 23 is a block diagram showing another exemplary device 2300 for transferring a message consistent with embodiments of the present disclosure. Referring to FIG. 23, the device 2300 includes a receiving unit 2301 and a processing unit 2302. The receiving unit 2301 is configured to receive a message relay request from an associated user account. The message relay request includes information regarding a message passing path and a message to be passed. The processing unit 2302 is configured to, when a local logged-in account (that is, the account logged into the device 2300) is a target account in the message passing path, display the message passing path and the message to be passed, and when the local logged-in account is a relay user account in the message passing path and if a preset user operation is detected, send the message relay request to a next stage user account in the message passing path.

Figure 24:
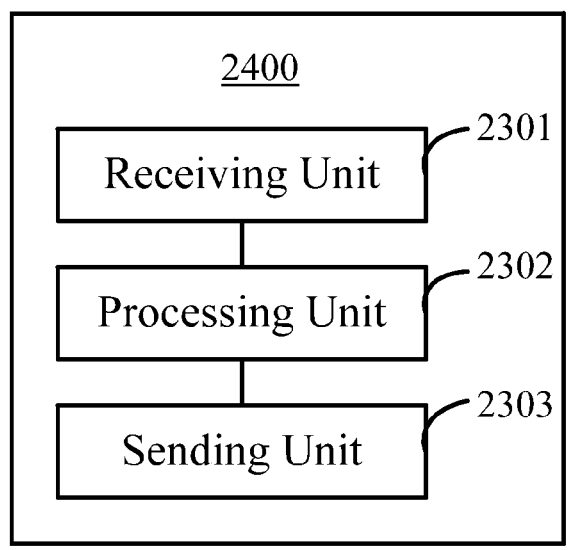

FIG. 24 is a block diagram showing another exemplary device 2400 for transferring a message consistent with embodiments of the present disclosure. The device 2400 is similar to the device 2300 shown in FIG. 23, except that the device 2400 further includes a sending unit 2303 configured to, when the preset user operation is detected, send an agreement message corresponding to the message relay request to a server.

According to the present disclosure, there is also provided a device for transferring a message, including: a processor and a memory storing instructions that, when executed by the processor, cause the processor to receive a message relay request from an associated user account, with the message relay request including information regarding a message passing path and a message to be passed, display, when a local logged-in account is a target account in the message passing path, the message passing path and the message to be passed, and send, when the local logged-in account is a relay user account in the message passing path and if a preset user operation is detected, the relay message passing request to a next stage user account in the message passing path.

According to the present disclosure, there is also provided a terminal including a memory and one or more programs stored in the memory. The terminal further includes one or more processors configured to execute instructions in the one or more programs that include the following operations: receiving a message relay request from an associated user account, with the message relaying request including information regarding a message passing path and a message to be passed, displaying, when a local logged-in account is a target account in the message passing path, the message passing path and the message to be passed, and sending, when the local logged-in account is a relay user account in the message passing path and if a preset user operation is detected, the message relay request to a next stage user account in the message passing path.

Specific manners of operation of respective modules of devices consistent with embodiments of the present disclosure have been described above in connection with the exemplary methods, and thus descriptions thereof are omitted here. Further, the above descriptions of exemplary devices are only exemplary. Units described above as separate parts may either be or not be physically separated, and the parts displayed as units may either be or not be physical units, i.e., they may be located in the same place or be distributed on a plurality of network units. A device consistent with the present disclosure can include some or all of the above modules.

Figure 25:
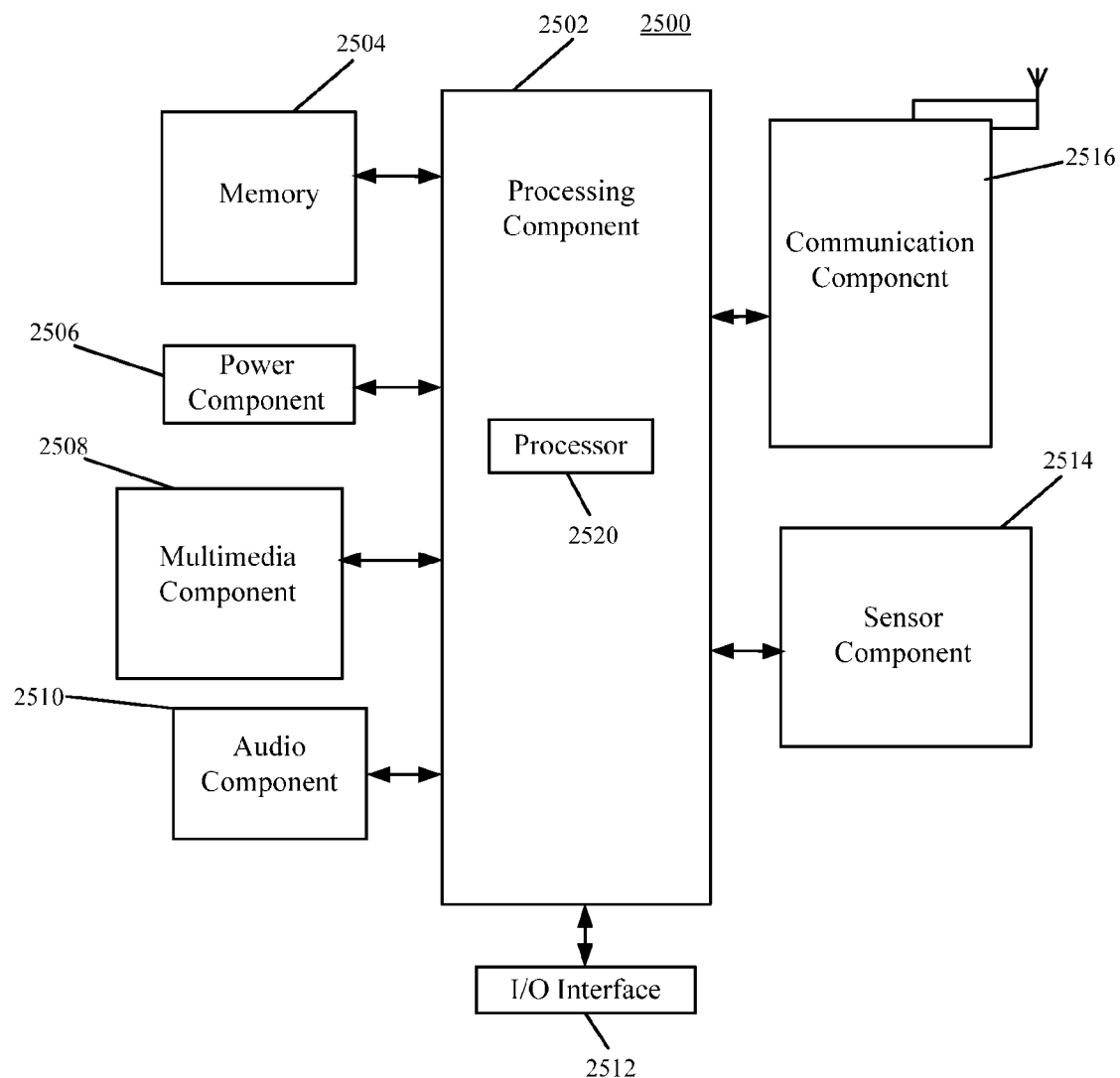
FIG. 25 is a block diagram showing a device implemented in a terminal for transferring a message according to another exemplary embodiment.

FIG. 25 is a block diagram showing an exemplary device 2500 for transferring a message consistent with embodiments of the present disclosure. For example, the device 2500 may be a mobile phone, a computer, a digital broadcast terminal, a messaging device, a gaming console, a tablet, a medical device, exercise equipment, a personal digital assistant, or the like.

Referring to FIG. 25, the device 2500 includes one or more of the following components: a processing component 2502, a memory 2504, a power component 2506, a multimedia component 2508, an audio component 2510, an input/output (I/O) interface 2512, a sensor component 2514, and a communication component 2516.

The processing component 2502 typically controls overall operations of the device 2500, such as the operations associated with display, telephone calls, data communications, camera operations, and recording operations. The processing component 2502 may include one or more processors 2520 to execute instructions to perform all or part of the steps in the above described methods. Moreover, the processing component 2502 may include one or more modules which facilitate the interaction between the processing component 2502 and other components. For instance, the processing component 2502 may include a multimedia module to facilitate the interaction between the multimedia component 2508 and the processing component 2502.

The memory 2504 is configured to store various types of data to support the operation of the device 2500. Examples of such data include instructions for any applications or methods operated on the device 2500, contact data, phonebook data, messages, pictures, video, etc. The memory 2504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2506 provides power to various components of the device 2500. The power component 2506 may include a power management system, one or more power sources, and any other components associated with the generation, management, and distribution of power in the device 2500.

The multimedia component 2508 includes a screen providing an output interface between the device 2500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2508 includes a front camera and/or a rear camera. The front camera and/or the rear camera may receive an external multimedia datum while the device 2500 is in an operation mode, such as a photographing mode or a video mode. Each of the front camera and the rear camera may be a fixed optical lens system or have focus and optical zoom capability.

The audio component 2510 is configured to output and/or input audio signals. For example, the audio component 2510 includes a microphone ("MIC") configured to receive an external audio signal when the device 2500 is in an operation mode, such as a call mode, a recording mode, and a voice recognition mode. The received audio signal may be further stored in the memory 2504 or transmitted via the communication component 2516. In some embodiments, the audio component 2510 further includes a speaker to output audio signals.

The I/O interface 2512 provides an interface between the processing component 2502 and peripheral interface modules, such as a keyboard, a click wheel, buttons, and the like. The buttons may include, but are not limited to, a home button, a volume button, a starting button, and a locking button.

The sensor component 2514 includes one or more sensors to provide status assessments of various aspects of the device 2500. For instance, the sensor component 2514 may detect an open/closed status of the device 2500, relative positioning of components, e.g., the display and the keypad, of the device 2500, a change in position of the device 2500 or a component of the device 2500, a presence or absence of user contact with the device 2500, an orientation or an acceleration/deceleration of the device 2500, and a change in temperature of the device 2500. The sensor component 2514 may include a proximity sensor configured to detect the presence of nearby objects without any physical contact. The sensor component 2514 may also include a light sensor, such as a CMOS or CCD image sensor, for use in imaging applications. In some embodiments, the sensor component 2514 may also include an accelerometer sensor, a gyroscope sensor, a magnetic sensor, a pressure sensor, or a temperature sensor.

The communication component 2516 is configured to facilitate communication, wired or wirelessly, between the device 2500 and other devices. The device 2500 can access a wireless network based on a communication standard, such as WiFi, 2G, or 3G, or a combination thereof. In one exemplary embodiment, the communication component 2516 receives a broadcast signal or broadcast associated information from an external broadcast management system via a broadcast channel. In one exemplary embodiment, the communication component 2516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2504, executable by the processor 2520 in the device 2500, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method implemented by a processor to transfer a message, comprising:
receiving, by the processor, a message passing request from a terminal, the message passing request including:
a message to be passed,
first information regarding a source account generating the message to be passed, and
second information regarding a target account of the message to be passed to,
wherein the source account and the target account are user accounts in a messaging application;
determining, by the processor, a message passing path from the source account to the target account according to stored association relationships between the user accounts in the messaging application, the message passing path including at least one relay user account; and
transferring, by the processor, the message to be passed to the target account through the message passing path,
wherein transferring the message to be passed to the target account through the message passing path includes:
sending a message relay request to a terminal in which one of the at least one relay user account is logged,
sending, when the terminal in which the one of the at least one relay user account is logged returns a first agreement message and if a next user account in the message passing path that follows the one of the at least one relay user account is another one of the at least one relay user account, the relay message passing request to a terminal in which the another one of the at least one relay user account is logged, and sending, when the terminal in which the one of the at least one relay user account is logged returns the agreement message and if the next user account in the message passing path that follows the one of the at least one relay user account is the target account, a session message including the message to be passed to a terminal in which the target account is logged.

2. The method according to claim 1, wherein an association relationship exists between adjacent user accounts in the message passing path.

3. The method according to claim 1, wherein:
determining the message passing path includes determining a plurality of message passing paths, and
transferring the message to be passed to the target account through the message passing path includes:
sending, by the processor, information regarding the plurality of message passing paths to a terminal in which the source account is logged,
receiving, by the processor, path selection information from the terminal in which the source account is logged, and
selecting, by the processor, one of the plurality of message passing paths corresponding to the path selection information to transfer the message to be passed to the target account.

4. The method according to claim 1, wherein:
determining the message passing path includes determining a plurality of message passing paths, and
transferring the message to be passed to the target account through the message passing path includes:
selecting, by the processor, one of the plurality of message passing paths that has a smallest number of relay user accounts to transfer the message to be passed to the target account.

5. The method according to claim 1, further comprising:
receiving, by the processor, a message viewing request from the terminal in which the one of the at least one relay user account is logged; and
performing, by the processor, one of the following according to the message viewing request:
sending the message to be passed to the terminal in which the one of the at least one relay user account is logged, or
sending the message viewing request and information regarding the one of the at least one relay user account to a terminal in which the source account is logged, and sending the message to be passed to the terminal in which the one of the at least one relay user account is logged when the terminal in which the source account is logged returns a second agreement message.

6. The method according to claim 1, wherein the session message further includes information regarding the message passing path.

7. The method according to any claim 1, wherein:
determining the message passing path includes determining a plurality of message passing paths, and
transferring the message to be passed to the target account through the message passing path includes:
switching, when the terminal in which the one of the at least one relay user account is logged returns a rejection message, to another one of the plurality of message passing paths, and
sending the message to be passed to the target account through the another one of the plurality of message passing paths.

8. A method implemented by a processor to transfer a message, comprising:
sending, by the processor, information regarding a target account to a server through a logged-in account, wherein the logged-in account and the target account are user accounts in a messaging application;
receiving, by the processor, a message passing path from the logged-in account to the target account determined by the server according to stored association relationships between user accounts in the messaging application, the message passing path including at least one relay user account; and
transferring, by the processor, a message to be passed to the target account through the message passing path,
wherein transferring the message to be passed to the target account through the message passing path includes:
sending a message relay request to a terminal in which one of the at least one relay user account or the target account is logged, the relay message passing request including information regarding the message passing path and the message to be passed;
the method further including:
when a receiver account that receives the message relay request is one of the relay user accounts and if the receiver account agrees to the message relay request, sending, by the receiver account, the message relay request to a terminal in which a user account next to the receiver account in the message passing path is logged, and
when the receiver account is the target account, displaying the information regarding the message passing path and the message to be passed on a terminal in which the target account is logged.

9. The method according to claim 8, wherein an association relationship exists between adjacent user accounts in the message passing path.

10. An electronic apparatus, comprising:
a processor; and
a non-transitory computer-readable storage medium storing instructions that, when executed by the processor, cause the processor to:
receive a message passing request from a terminal, the message passing request including:
a message to be passed,
first information regarding a source account generating the message to be passed, and
second information regarding a target account of the message to be passed to,
wherein the source account and the target account are user accounts in a messaging application,
determine a message passing path from the source account to the target account according to stored association relationships between the user accounts in the messaging application, the message passing path including at least one relay user account, and
transfer the message to be passed to the target account through the message passing path,
wherein in transferring the message to be passed to the target account through the message passing path, the instructions further cause the processor to:
send a message relay request to a terminal in which one of the at least one relay user account is logged,
send, when the terminal in which the one of the at least one relay user account is logged returns a first agreement message and if a next user account in the message passing path that follows the one of the at least one relay user account is another one of the at least one relay user account, the relay message passing request to a terminal in which the another one of the at least one relay user account is logged, and send, when the terminal in which the one of the at least one relay user account is logged returns the agreement message and if the next user account in the message passing path that follows the one of the at least one relay user account is the target account, a session message including the message to be passed to a terminal in which the target account is logged.

11. The electronic apparatus according to claim 10, wherein association relationship exists between adjacent user accounts in the message passing path.

12. The electronic apparatus according to claim 10, wherein the instructions further cause the processor to:
determine a plurality of message passing paths,
send information regarding the plurality of message passing paths to a terminal in which the source account is logged,
receive path selection information from the terminal in which the source account is logged, and
select one of the plurality of message passing paths corresponding to the path selection information to transfer the message to be passed to the target account.

13. The electronic apparatus according to claim 10, wherein the instructions further cause the processor to:
determine a plurality of message passing paths, and
select one of the plurality of message passing paths that has a smallest number of relay user accounts to transfer the message to be passed to the target account.

14. An electronic apparatus, comprising:
a processor; and
a non-transitory computer-readable storage medium storing instructions that, when executed by the processor, cause the processor to:
send information regarding a target account to a server through a logged-in account,
receive a message passing path from the logged-in account to the target account determined by the server according to stored association relationships between user accounts, the message passing path including at least one relay user account, and
transfer a message to be passed to the target account through the message passing path,
wherein in transferring the message to be passed to the target account through the message passing path, the instructions further cause the processor to:
send a message relay request to a terminal in which one of the at least one relay user account or the target account is logged, the relay message passing request including information regarding the message passing path and the message to be passed;
when a receiver account that receives the message relay request is one of the relay user accounts and if the receiver account agrees to the message relay request, send, by the receiver account, the message relay request to a terminal in which a user account next to the receiver account in the message passing path is logged, and
when the receiver account is the target account, display the information regarding the message passing path and the message to be passed on a terminal in which the target account is logged.

15. A non-transitory computer-readable storage medium storing instructions that, when executed by a processor in a device, cause the device to:
receive a message passing request, the message passing request including:
a message to be passed,
first information regarding a source account generating the message to be passed, and
second information regarding a target account of the message to be passed to,
wherein the source account and the target account are user accounts in a messaging application;
determine a message passing path from the source account to the target account according to stored association relationships between the user accounts in the messaging application, the message passing path including at least one relay user account; and
transfer the message to be passed to the target account through the message passing path,
wherein in transferring the message to be passed to the target account through the message passing path, the instructions further cause the processor to:
send a message relay request to a terminal in which one of the at least one relay user account is logged,
send, when the terminal in which the one of the at least one relay user account is logged returns a first agreement message and if a next user account in the message passing path that follows the one of the at least one relay user account is another one of the at least one relay user account, the relay message passing request to a terminal in which the another one of the at least one relay user account is logged, and
send, when the terminal in which the one of the at least one relay user account is logged returns the agreement message and if the next user account in the message passing path that follows the one of the at least one relay user account is the target account, a session message including the message to be passed to a terminal in which the target account is logged.

* * * * *